US012688719B1

(12) United States Patent
Gong et al.

(10) Patent No.: US 12,688,719 B1
(45) Date of Patent: Jul. 21, 2026

(54) SYSTEM AND METHOD FOR ARTIFICIAL INTELLIGENCE (AI)-POWERED FOOD CLASSIFICATION AND CONSUMPTION TRACKING

(71) Applicant: Foodfx Inc, San Jose, CA (US)

(72) Inventors: Fengmin Gong, Los Altos Hills, CA (US); Jun Du, Cupertino, CA (US); Samir Virmani, San Jose, CA (US); Kianoosh Ghazi, Pleasant Hill, CA (US)

(73) Assignee: Foodfx Inc, San Jose, CA (US)

( * ) Notice: Subject to any disclaimer, the term of this patent is extended or adjusted under 35 U.S.C. 154(b) by 258 days.

(21) Appl. No.: 18/661,424

(22) Filed: May 10, 2024

(51) Int. Cl.
| | |
|---|---|
| *G06V 20/68* | (2022.01) |
| *G01G 19/414* | (2006.01) |
| *G06V 10/24* | (2022.01) |
| *G06V 10/44* | (2022.01) |
| *G06V 10/50* | (2022.01) |
| *G06V 10/75* | (2022.01) |
| *G06V 10/764* | (2022.01) |
| *G06V 10/774* | (2022.01) |
| *G06V 10/94* | (2022.01) |

(52) U.S. Cl.
CPC ........... *G06V 20/68* (2022.01); *G01G 19/414* (2013.01); *G06V 10/242* (2022.01); *G06V 10/44* (2022.01); *G06V 10/50* (2022.01); *G06V 10/757* (2022.01); *G06V 10/764* (2022.01); *G06V 10/774* (2022.01); *G06V 10/945* (2022.01)

(58) Field of Classification Search
CPC ........ G06V 20/68; G06V 10/50; G06V 10/44; G06V 10/757; G06V 10/774; G06V 10/764; G06V 10/242; G06V 10/945; G01G 19/414

USPC ......................................................... 382/110
See application file for complete search history.

(56) References Cited

U.S. PATENT DOCUMENTS

2023/0196802 A1* 6/2023 Gong .................... G06V 10/82
                                                        382/110

OTHER PUBLICATIONS

Espinoza, Alejandro Zachary. An Application of Deep Learning Models to Automate Food Waste Classification. Portland State University, 2019. (Year: 2019).*

(Continued)

*Primary Examiner* — Jonathan S Lee
(74) *Attorney, Agent, or Firm* — Sheppard Mullin Richter & Hampton LLP

(57) ABSTRACT

The disclosed system, apparatus, and method enhance the accuracy of food classification consumption tracking. The method involves obtaining a weight measurement from a scale for a container filled with food. Subsequently, a 2-dimensional (2D) image and a 3-dimensional (3D) point cloud of the container are captured using a 2D camera and a 3D camera, respectively. The method proceeds by scanning the point cloud top-down to detect the shape of the container's rim. Utilizing these extracted features and the rim's shape, the container is accurately identified. A prerecorded weight of the empty container, specific to the identified container, is then retrieved. Finally, the net weight of the food in the container is calculated by subtracting the weight of the empty container from the total filled weight. The 2D images in combination of the 3D images are also used for identifying the food in the container.

20 Claims, 9 Drawing Sheets

(56)          References Cited

OTHER PUBLICATIONS

Gonzalez, Bryan, et al. "Automated food weight and content estimation using computer vision and AI algorithms." Sensors 24.23 (2024): 7660. (Year: 2024).*

Jia, Wenyan, et al. "A novel approach to dining bowl reconstruction for image-based food volume estimation." Sensors 22.4 (2022): 1493. (Year: 2022).*

Herzig, David, et al. "Volumetric food quantification using computer vision on a depth-sensing smartphone: preclinical study." JMIR mHealth and uHealth 8.3 (2020): e15294. (Year: 2020).*

Jia, Wenyan, et al. "Estimating amount of food in a circular dining bowl from a single image." Proceedings of the 8th International Workshop on Multimedia Assisted Dietary Management. 2023. (Year: 2023).*

* cited by examiner

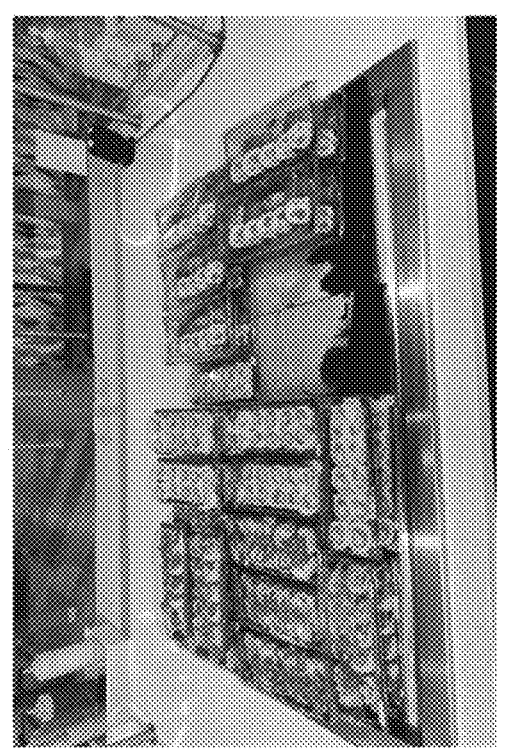
130 Premade food station
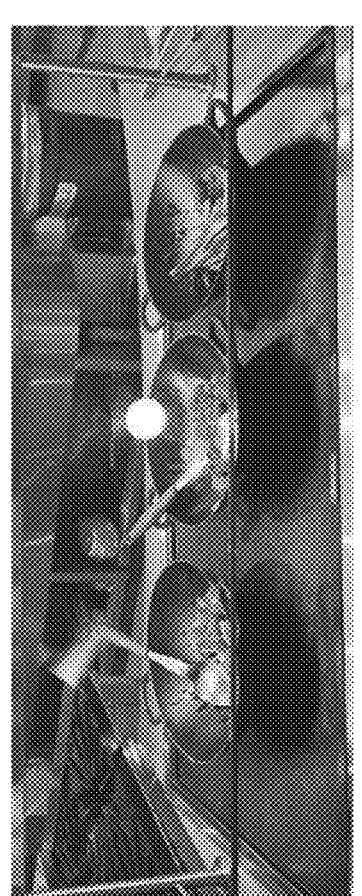
120 Batch cooking station
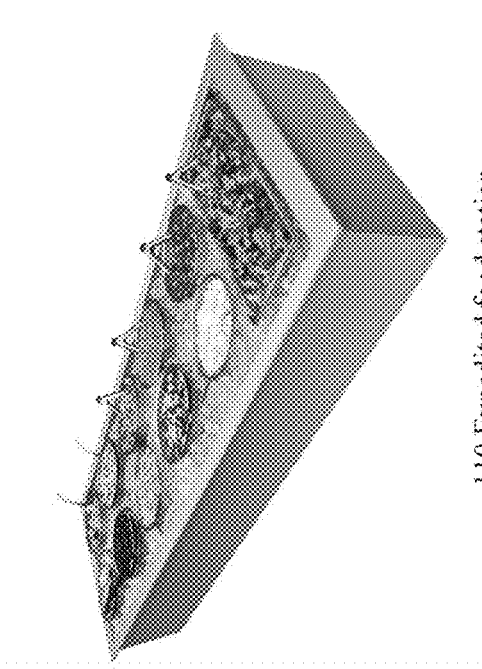
110 Expedited food station
*FIG. 1A*

150 2D and 3D cameras

Optional IR temperature sensor

160 Scale

170 Computing device/tablet

Figure 5:
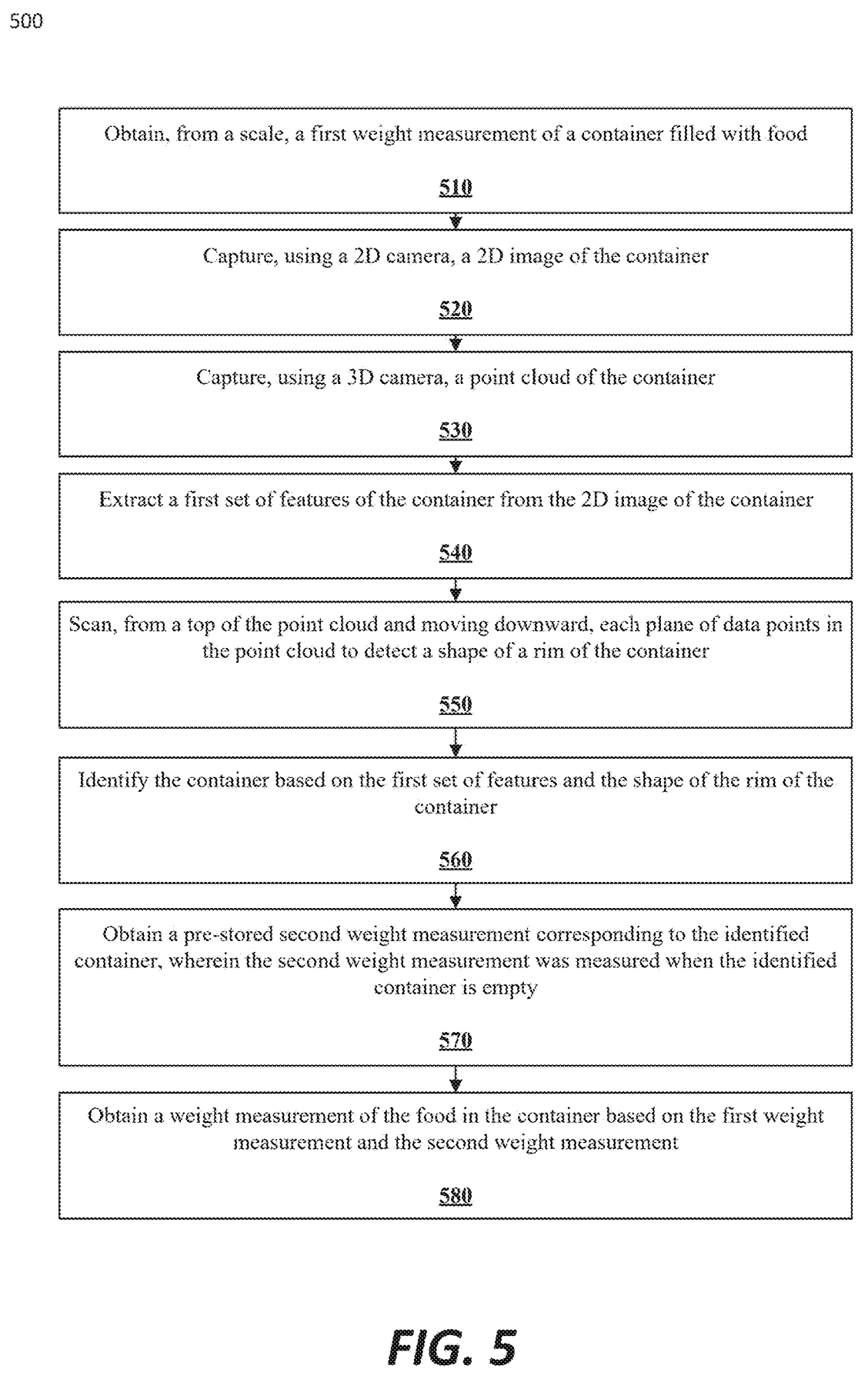

500

Obtain, from a scale, a first weight measurement of a container filled with food

510

Capture, using a 2D camera, a 2D image of the container

520

Capture, using a 3D camera, a point cloud of the container

530

Extract a first set of features of the container from the 2D image of the container

540

Scan, from a top of the point cloud and moving downward, each plane of data points in the point cloud to detect a shape of a rim of the container

550

Identify the container based on the first set of features and the shape of the rim of the container

560

Obtain a pre-stored second weight measurement corresponding to the identified container, wherein the second weight measurement was measured when the identified container is empty

570

Obtain a weight measurement of the food in the container based on the first weight measurement and the second weight measurement

SYSTEM AND METHOD FOR ARTIFICIAL INTELLIGENCE (AI)-POWERED FOOD CLASSIFICATION AND CONSUMPTION TRACKING

TECHNICAL FIELD

Food service operations, such as cafeterias and buffets, face significant challenges in managing food inventory, reducing waste, and ensuring food safety. Traditional systems often rely on manual tracking and basic digital scales, which do not provide detailed information about the types and quantities of food consumed or wasted. Moreover, these systems typically fail to differentiate between the weight of the container and the food itself, leading to inaccuracies in food consumption data.

The disclosure generally relates to Artificial Intelligence (AI) powered systems and methods for food classification and consumption tracking, specifically, portable devices equipped with metrics learning-based AI models for food classification and statistical model-based consumption tracking, enabling continuous and on-the-fly learning and fast retraining with delayed labeling.

BACKGROUND

Existing technologies also struggle with the mobility and adaptability required in modern food service environments. Many systems are not designed to handle the dynamic and mobile nature of food service settings, where food items and their containers can vary widely in size, shape, and material.

Furthermore, current AI-based solutions for food container and/or food item classification are mainly based on offline training, which requires a large number of training images of the known food items/containers to identify a given food item/container with a reasonable classification accuracy. This extensive training requirement demands significant computational resources, with models often growing to hundreds of megabytes or even gigabytes in size. However, in reality, the number of images of a food item or a food container might be very low and far from being sufficient to train a reasonably accurate model. In addition, these off-line trained AI models may not perform well when unknown food items/containers are presented, and have difficulty to perform on-the-fly training or continuous training after deployment. Empirical data shows that the lag in training and updating AI models can lead to delays of up to six weeks before newly introduced items are recognized and classified correctly by these heavyweight AI systems.

Therefore, there is a need for an improved food service management system that addresses these challenges by accurately identifying containers, integrating various technologies, enabling mobility and network connectivity, providing real-time data processing and alerts, classifying food and pans effectively, handling unidentified items efficiently, and supporting continuous training and updating of AI models.

SUMMARY

Various embodiments of the present specification may include systems, methods, and apparatus for classifying/identifying food items, food containers, and tracking food consumptions.

In some embodiments, an example apparatus includes a scale with a plurality of load cells or weight sensors, a 2-dimensional (2D) camera, and a 3-dimensional (3D) camera, along with one or more processors and memory units that store executable instructions. The operations of this apparatus are activated when a container filled with food is placed on the scale. It begins by obtaining a first weight measurement of the container from the scale. Following this, the apparatus captures a 2D image and a 3D point cloud of the container. It extracts a set of features from the 2D image and scans the point cloud from top to bottom, identifying each plane to determine the shape of the container's rim. The container is then identified based on these features, and a previously recorded empty weight of the container is retrieved to calculate the food's weight.

Further implementations of this apparatus involve advanced feature extractions such as detecting the rim's shape during scanning and comparing it with pre-registered rim shapes. The apparatus can also determine the container's orientation in the 2D image, adjusting the image to align with the camera's reference axis. Advanced image processing includes creating bounding boxes and using machine learning models to extract and analyze features like texture, color, size, and shape. The apparatus can further identify food items using a local food classification model, and if identification fails, it prompts user interaction for label selection and model retraining. This interaction also extends to uploading data to servers to update and share machine learning models across other apparatuses.

In broader applications, the system encompasses multiple food scanning apparatuses distributed across various locations, each equipped with similar technology. These systems capture detailed data from food containers, including volume and rim shape, to facilitate accurate identification and weight measurement, enhancing the efficiency of food service operations.

In another aspect, the described method involves capturing weight and dimensional data from food containers using both 2D and 3D cameras to assist in precise food measurement and identification processes. These capabilities are supported by corresponding computer systems, apparatuses, and computer programs configured to implement these methods across various devices.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 1A illustrates exemplary scenarios in which an AI-powered food classification and consumption tracking system may be implemented.

FIG. 5 illustrates an exemplary method for measuring food weight using the AI-powered food and consumption tracking classification system in accordance with some embodiments.

DETAILED DESCRIPTION

Figure 1B:
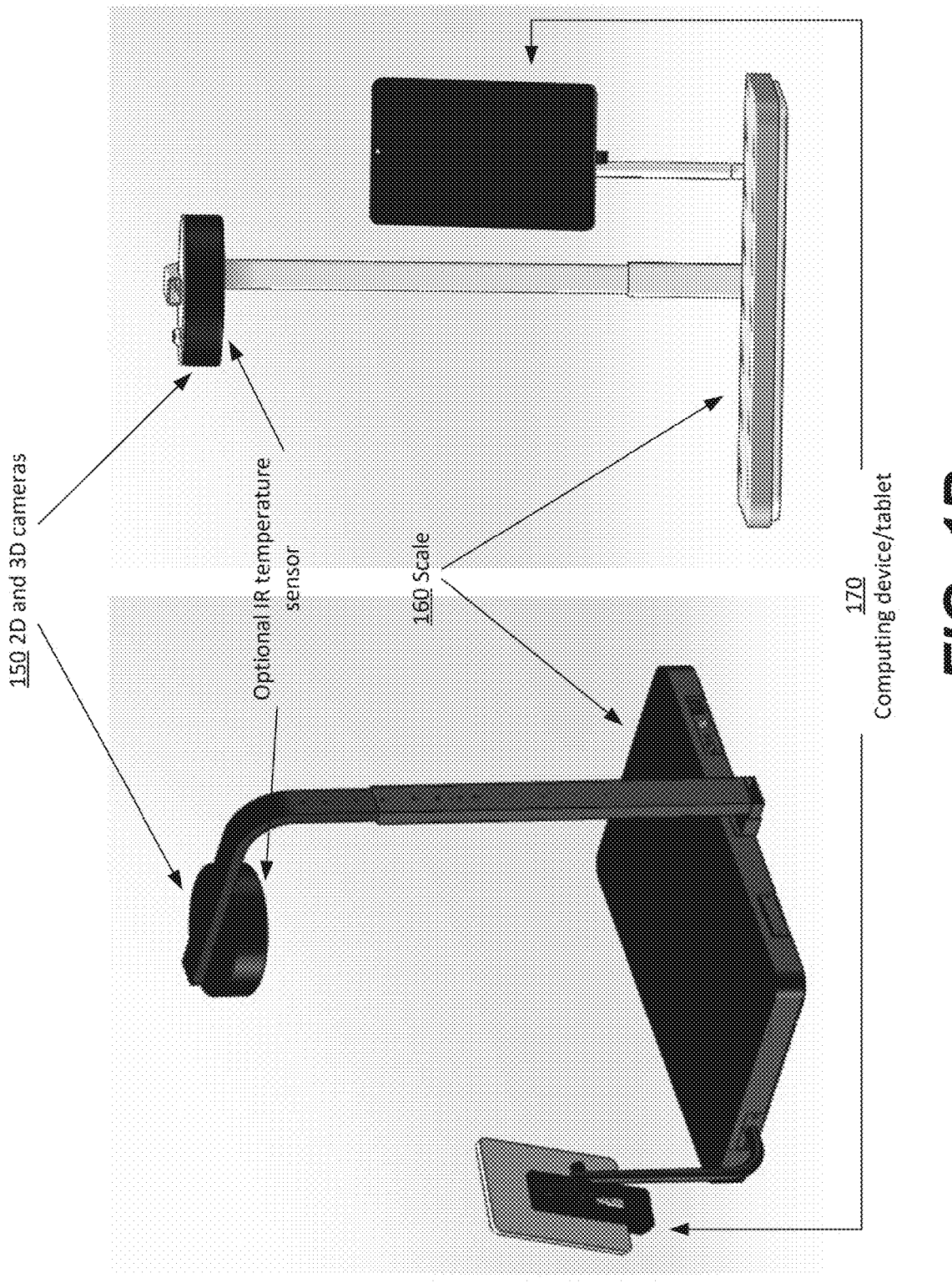
FIG. 1B illustrates an exemplary AI-powered food classification and weight measurement apparatus in accordance with some embodiments.

The description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

The following disclosure describes a system to enhance the efficiency and accuracy of identifying and tracking unpackaged food consumption and leftovers in food service environments such as cafeterias and buffets. The system is built around a mobile tracker, a compact device that combines a base equipped with four load cells for weight measurement and both 2D and 3D cameras for detailed imaging. This hardware setup may be connected to a tablet or a computing device that functions as both the display and the controller, enabling easy interaction and control.

One of the key functionalities of the system is its ability to identify food containers (e.g., plates, bowls, pans) accurately. Using the 3D depth camera, the system captures intricate details of each container, differentiating containers that may appear similar but differ in depth or design. This precise identification is crucial to ensure that weight measurements reflect only the food content, excluding the container's weight.

The system's software is also highly interactive, running on the mobile tracker to provide a user-friendly interface. It processes data in real time, which allows it to quickly identify and classify new types of containers or food items. It alerts users immediately when an unrecognized item is detected, prompting them to update the database promptly. This feature is part of the system's on-the-fly learning capability, where it learns about new food items as they are introduced, continually improving its accuracy and functionality.

Artificial intelligence (AI) techniques implemented in this system include a hybrid approach that combines the metrics-learning model for dealing with known and unknown items (food items and/or containers) and image-based classification models (i.e., a combination of a You Only Look Once (YOLO) model and a statistical model) for food/container classification. The AI models may be updated daily with new data collected from the mobile trackers and synchronize the updated models back to the mobile trackers, enhancing the system's ability to recognize and classify various food items effectively over time.

An example practical application of the system may include scanning and tracking food items before and after they are served. The scanning process is designed to be quick and efficient, typically completing within a few seconds, allowing food service operations to monitor consumption and leftover quantities with minimal disruption. The system supports full cycle tracking of food from initial serving to post-consumer waste, providing comprehensive insights into food production and waste, which helps in managing these operations more sustainably.

FIG. 1A illustrates exemplary scenarios in which an AI-powered food classification system may be implemented. The first scenario involves an expedited food station 110 (such as a salad bar or a fruit station), where the food containers may be placed on ice or cold water to keep the food cold and fresh. Another example is a batch cooking station 120, where the food containers (e.g., wok pan as shown in FIG. 1A) are placed on hot stoves or burners. As yet another example, a pre-made food station 130 (e.g., grab-and-go food stations) scenarios, pre-packaged food boxes are piled together on a large tray for users to pick up.

In these real-world scenarios, it is common for menus to undergo regular rotations without repeating items within the same cycle. Often, the available sample size per food class is limited, sometimes to just a few images. Conventional AI-based methods for classifying food necessitate training the model with a large dataset provided by the service establishment before the model can be deployed for actual classification tasks. Once deployed, updating or retraining these models poses significant challenges due to their large size and the substantial volume of data needed for retraining. Essentially, traditional AI models lack the capability for continuous, on-the-fly learning or flexible retraining approaches, resulting in delays that can extend from several months to even a year between updates. This limitation is particularly problematic for establishments that frequently change their menus.

Moreover, the scenarios described here may demand just-in-time cooking (to replenish the popular food items in time), which requires the real-time tracking and prediction of food consumption. Throughout a consumption cycle, the appearance of a food item can vary significantly (for instance, the gradually changing appearance of food in a container during the consumption). This real-time tracking and learning presents a considerable challenge for current AI models, which are typically trained offline on static images of food items (e.g., taken from various angles or under different lighting conditions) without accounting for the changing states of food during consumption. Furthermore, AI models trained offline are incapable of adapting to the evolving appearances of food items as they are consumed.

FIG. 1B illustrates an exemplary AI-powered food classification and consumption tracking apparatus in accordance with some embodiments. The AI-powered food classification apparatus illustrated in FIG. 1B include example hardware configuration. Depending on the implementation, the AI-powered food classification apparatus may include fewer, more, or alternative components.

The AI-powered food classification and consumption tracking apparatus illustrated in FIG. 1B may also be referred to as a compact and mobile food scanning apparatus or a mobile tracker designed for food service management. In some embodiments, the apparatus may include a scale 160 configured with high-precision load cells to measure the weight of the food and containers placed thereon. The precise data collected from these load cells are essential for monitoring food consumption and managing waste effectively, providing food service operators with accurate metrics to optimize food preparation and reduce waste.

In some embodiments, the apparatus may further include 2D and 3D cameras 150 configured to capture high-resolution images and depth information of the food items and containers placed on the device. The 3D camera, in particular, is critical for accurately identifying the food containers, distinguishing them based on size, shape, depth, and design characteristics. This accurate identification is fundamental to ensuring that the weight measurements taken by the device reflect only the food content, excluding the container weight. In some embodiments, the 2D and 3D cameras may be placed at the top of the tracker overlooking the scale 160. In some embodiments, a trained metrics-learning model may be applied to the 2D images (in some cases, in combination of the 3D images) to classify the food in the container. By automatically learning the identity and weight of the food, the apparatus in FIG. 1B is the fundamental unit in the food classification and consumption tracking system described below.

In some embodiments, the apparatus may further include a computing device 170 (e.g., a tablet, a mobile device). This computing device 170 acts as both the display and controller for the mobile tracker, interfacing with the cameras 150 and the scale 160. It may run a dedicated application that processes the visual and weight data collected, offering a user-friendly interface for food service staff to interact with the system. The tablet enables real-time processing and feedback, essential for immediate updates and adjustments during service operations.

In some embodiments, the apparatus may also include other interfaces such as a power port, a network interface (e.g., Ethernet or WiFi), Bluetooth connectivity, Radio Frequency Identification (RFID) transceiver, etc.

This compact and mobile design of the apparatus allows for ease of movement and placement within various food service settings. Its lower profile and small footprint make it ideally suited for environments where space is limited and mobility is crucial.

For instance, a plurality of such mobile trackers may be placed/installed at various locations within a food service venue to offer a comprehensive solution to track food consumption and monitor waste across the entire operation. This distributed setup enhances the granularity and accuracy of data collection, enabling a more detailed analysis of food usage patterns and waste generation.

Figure 2:
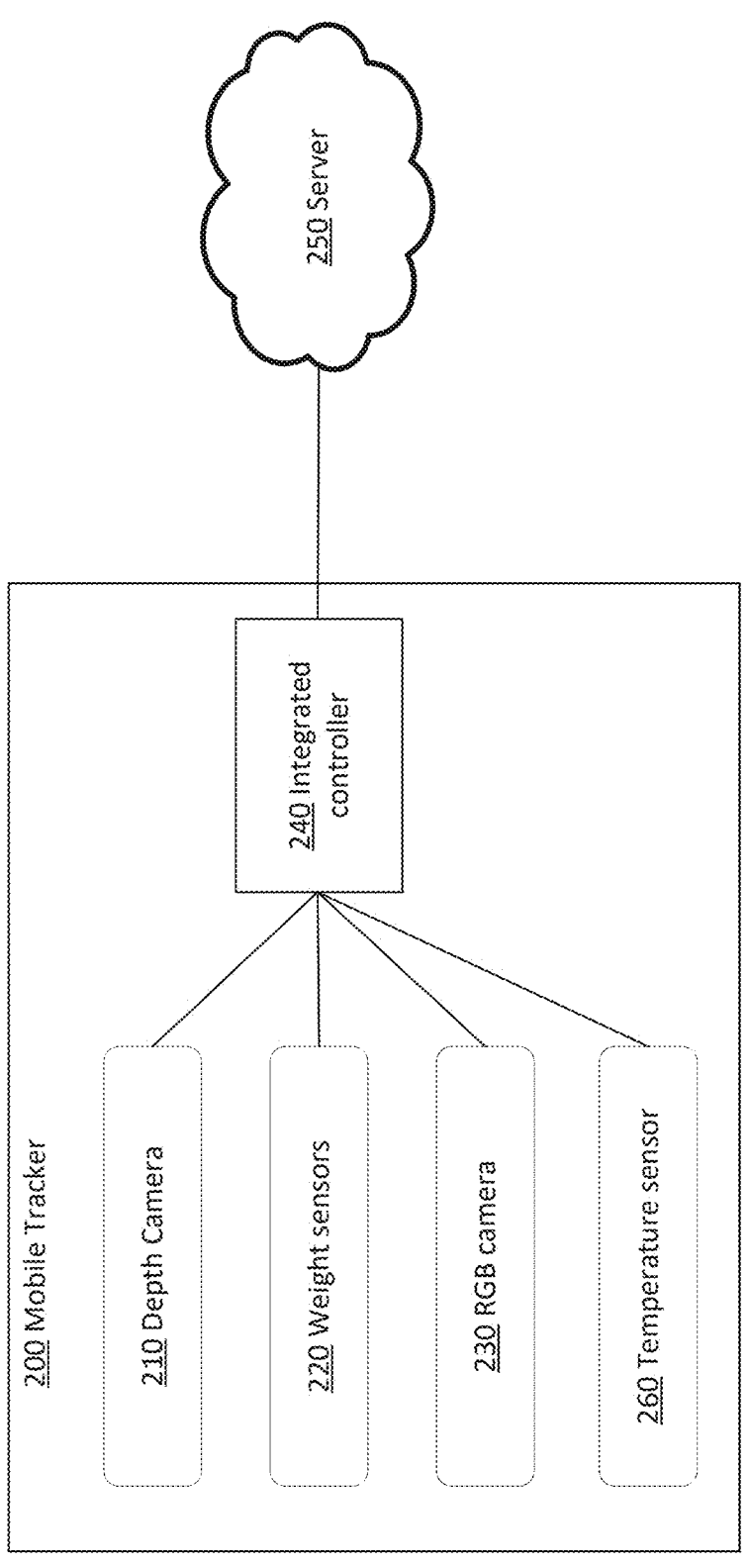
FIG. 2 illustrates an exemplary system diagram of an AI-powered food classification and consumption tracking system in accordance with some embodiments.

FIG. 2 illustrates an exemplary system diagram of an AI-powered food classification and consumption tracking system in accordance with some embodiments. The mobile tracker 200 in FIG. 2 refers to the AI-powered food classification and consumption tracking apparatus in FIG. 1B. There may be a plurality of such mobile trackers 200 installed at a venue. The server 250 may be a cloud-based server that interacts with the plurality of mobile trackers 200.

As shown, the mobile tracker 200 may include a plurality of sensors for collecting various features of a food container placed under the tracker 200. For instance, the mobile tracker 200 may include a 3D camera, such as a depth camera 210, to capture information about the distance between the sensor and the food objects (e.g., food container containing food) in the camera's field of view, providing a three-dimensional representation of the scene. In some embodiments, the depth camera 210 may project a pattern of light (often infrared) onto the food object, and then capture how this light pattern is distorted by the food object in the scene. These distortions are used to calculate the depth information of the food object in the scene. Alternatively, the camera 210 may emit a light signal (e.g., infrared) towards the food object and measure the time it takes for the light to bounce back to the camera 210. This time measurement helps determine the distance of various parts of the food object in the camera's view.

The tracker 200 may also incorporate several weight sensors 220 situated beneath a platform (such as a scale) to measure the weights of food objects placed on the platform. Additionally, it features an RGB (Red, Green, Blue) camera 230 for capturing two-dimensional images of the food objects and a temperature sensor 260 for assessing the temperature of these objects. The temperature data may be used for maintaining food safety and quality within the food service environment and can prompt necessary actions and alerts, such as determining when food items need to be replaced on the service line.

In some embodiments, the temperature sensor 260 may be an infrared (IR) temperature sensor. The sensor is designed to remotely measure the temperature of food items, providing a non-contact solution that is both efficient and hygienic. By detecting the infrared radiation emitted from the food, the sensor can accurately determine its surface temperature, and transmits the temperature measurement to the on-device controller (e.g., the mini controller 240). In some embodiments, this data is used for ensuring that food items are kept within safe temperature ranges, adhering to regulatory standards that specify cold foods be maintained below 41° F. and hot foods above 135° F. This additional data layer can contribute to sustainability and waste management efforts. By identifying when food items fall into the "temperature danger zone" (between 41° F. and 135° F.), the system can prompt timely interventions (e.g., by throwing out an alert or sending a message), thereby reducing waste and enhancing the overall safety and quality of food service operations. Alternatively or additionally, the measured temperature data may be used to generate a heat graph. This graph visualizes the temperature distribution of a food item across a period of time. The heat graph not only facilitates immediate corrective actions when temperature deviations are detected but also serves as a critical input for the AI model described below. By incorporating the heat graph with the 2D image and 3D image, the AI model can enhance its predictive capabilities, more accurately identifying food items and assessing their quality.

Figure 4:
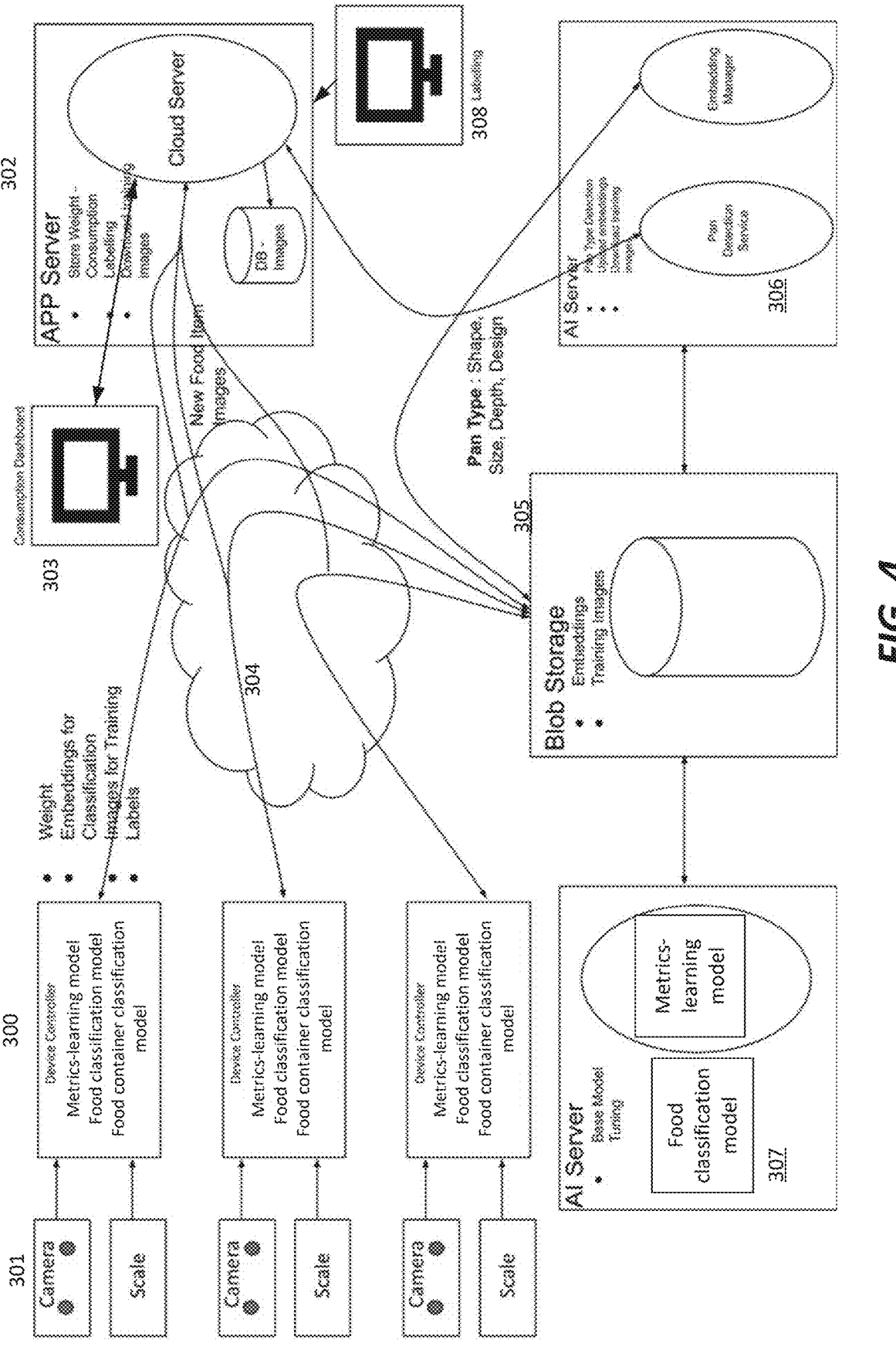
FIG. 4 illustrates another exemplary system diagram of an AI-powered food classification and consumption tracking system in accordance with some embodiments.

Furthermore, the tracker 200 may include a mini controller 240 tasked with aggregating and processing the data gathered by the sensors. This mini controller 240 could be an integrated circuit board within the tracker 200, or an on-premises device that connects to the sensors. The controller 240 may have storage capacity and data processing capability. For instance, the controller 240 may download one or more trained AI models from the server 250, and deploy the models for performing local inference (e.g., edge computing). The controller 240 may be configured to send newly collected data (e.g., local data) back to the server for retraining of the models and/or propagating the updated models to other trackers 200. Equipped with one or more processors, the controller 240 is programmed to perform local inference and to provisionally label unknown or new food items or containers, thus facilitating ongoing learning (or called training on-the-fly) and inference at a local level. A more detailed example of this system is illustrated in FIG. 4.

Figure 3A:
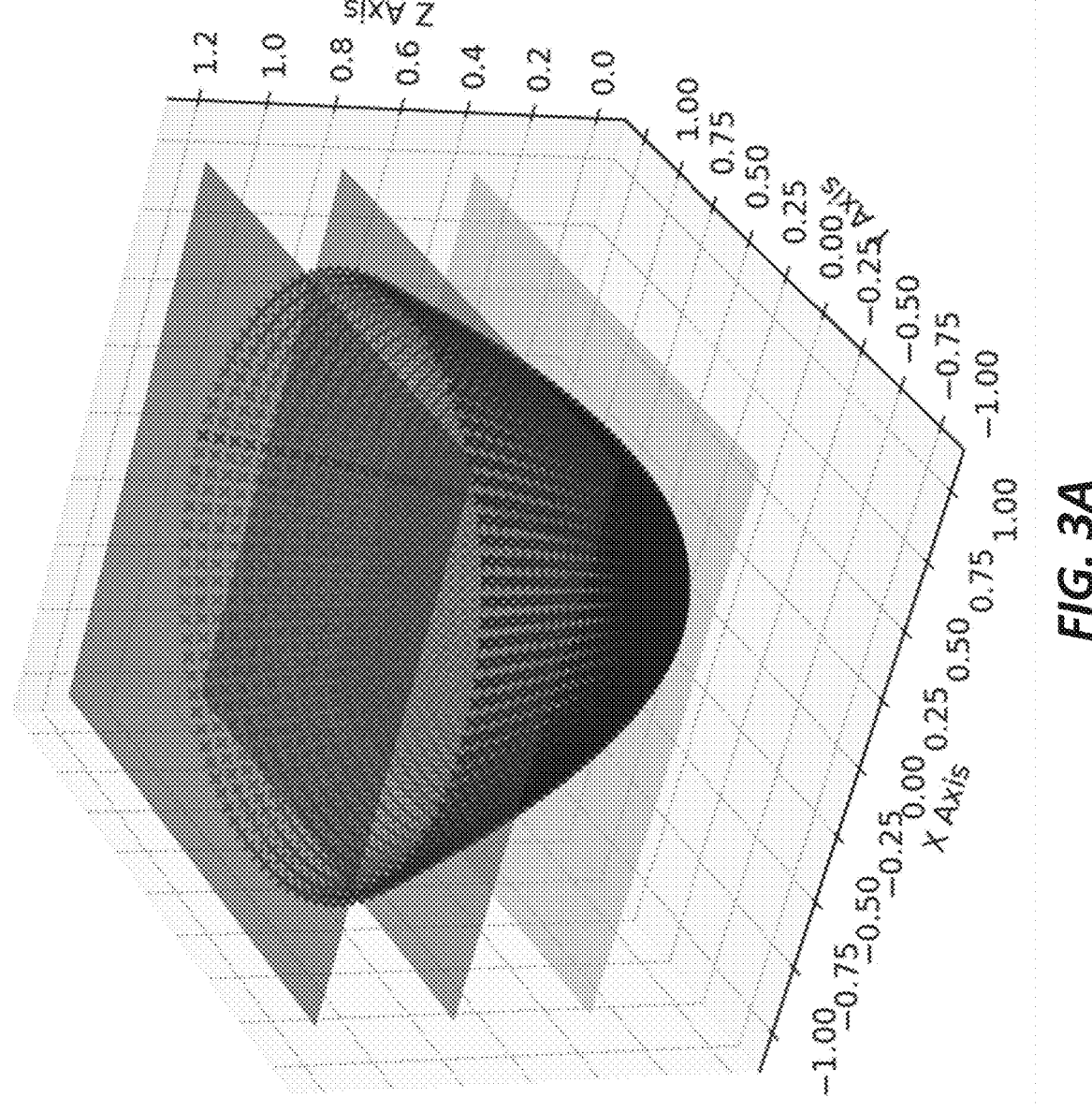
FIG. 3A illustrates an exemplary method for identifying food containers using point clouds, in accordance with some embodiments.

FIG. 3A illustrates an exemplary method for identifying food containers using point clouds, in accordance with some embodiments. This method may be implemented on the AI-powered food classification and consumption tracker apparatus described in FIGS. 1B and 2.

Some existing food container identification or classification models are solely based on 2D images captured by 2D cameras such as RGB cameras. When utilizing a 2D camera to capture images of a food container, several visual features can be extracted that are useful for identification purposes. These features include color, texture, and shape outlines. The color feature captures the hues and shades visible on the container, which can be distinctive. Texture provides insight into surface patterns or material characteristics, helping to differentiate between containers made from different materials or featuring different finishes. The shape outline offer a contour of the container as seen from the camera's perspective, although it does not provide depth or three-dimensional details.

In contrast, a 3D camera offers additional data that a 2D camera cannot, significantly enhancing the identification process. Specifically, 3D cameras can capture depth information, which gives precise measurements of the container's height, width, and depth, and can accurately portray the physical volume and structure of the container. This depth data is crucial for understanding the actual size and space a container occupies, which is vital for identifying the weight and volume of the container.

The additional features provided by 3D cameras are important for accurate identification because they enable a more comprehensive analysis of the physical attributes of containers. For instance, two containers might look identical in a 2D image (similar shape and color), but they could have different depths, affecting their capacity and weight. By incorporating 3D data with the 2D data, systems can distinguish between such containers effectively, ensuring that the correct container type is accurately identified.

In some embodiments, a critical step for classifying food containers in this automated system is rim detection. In many cases, it might be difficult to detect the rim of a food container only based on 2D images, especially when the container rim is not distinctly marked or if the color and texture of the container rim do not contrast sharply with its background. In addition, in 2D imaging, the perspective from which the photo is taken can significantly affect the visibility of the rim. If the 2D camera is not aligned perfectly with the top edge of the container, the rim might not be visible or could appear distorted, leading to inaccurate classifications.

In contrast, a 3D camera captures not only the length and width of the food container but also its depth, which is crucial for identifying the precise point at which the container rim begins. By creating a depth map of the container, 3D imaging allows the system to see the exact contours and edges of the container, including the rim, regardless of the container's color or texture.

In some embodiments, the 3D camera may generate a point cloud of the food container. The point cloud includes a set of data points in space, where each point represents a position on the surface of an object as detected by the 3D camera. For instance, each data point in a point cloud represents a coordinate in three-dimensional space (X, Y, Z). In some cases, each data point may further include color and intensity information.

The rim of the food container may be detected from the point cloud using a plane-by-plane scanning method. For instance, a controller (e.g., the on-device controller 240 in FIG. 2) may scan the point cloud from the top of the point cloud downward, one plane of data points at a time. That is, the scanning starts at the highest points detected by the 3D camera and moves downward through each horizontal plane, or layer of data points, descending towards the base of the point cloud. As the scanning progresses downward, each horizontal plane is examined to extract and analyze features relevant to identifying structural elements of the containers.

During this downward scanning, the controller may monitor for depth information of the data points in each plane. In some embodiments, the first plane of data points with identical depth values may be identified as the rim of the food container.

In some embodiments, the shape of the detected rim may be compared against a plurality of pre-registered shapes of rims. The rim of the container can be square, rectangular, round, oval, or any irregular shapes such as a "wave" shape. These pre-registered rim shapes are obtained during an onboarding process, in which a plurality of containers are placed under the 3D camera (e.g., on the scale 160 and under the 3D camera 150 of FIG. 1B) for scanning. The pre-registered rim shapes may be associated with corresponding food containers during the onboarding process.

In some embodiments, when the shape of the detected rim (e.g., the first plane of data points with identical depth values detected during the downward scanning process) matches with one of the pre-registered shapes of rims, it is confirmed that the rim of the food container has been detected. In some embodiments, a statistical model may be used to detect the matching probabilities between the detected rim and the pre-registered rims.

Note that different food containers may have the same rim shape, therefore the rim shape may be used as one of multiple factors for identifying the food containers. Other features such as volumes (obtained from the 3D image), color and texture (obtained from the 2D image), etc., may be aggregated to identify the food container.

In some cases, the downward scanning process may find a first plane of data points with identical depth values, but the shape formed by the data points does not match with any of the pre-registered rim shapes. In these cases, the first plane of data points may be deemed as belonging to an object extended above the rim of the container (e.g., food item, utensil, decoration). This first plane of data points may be ignored, and the downward scanning process continues.

In certain scenarios, the downward scanning process may encounter multiple objects that extend to, and possibly beyond, the height of the rim of the food container. In such instances, the 3D data can undergo processing, such as clustering techniques, to determine if these objects represent distinct items. Subsequently, the most suitable item may be identified as belonging to the rim of the food container, while the remaining objects are filtered out. The suitability of the objects may be based on the object itself or object positioning.

For instance, the controller (e.g., the on-device controller 240 in FIG. 2) may extract the outer edge from each set of data points. Once the outer edges are defined, the controller then proceeds to compare these with a pre-registered shape of the rim, which acts as a reference model. This comparison involves calculating the similarity distance between the extracted outer edge of each set of data points and the reference rim shape, e.g., by using Hausdorff Distance. The similarity distance is a numerical value that quantifies how much one shape differs from another. If this computed similarity distance exceeds a predefined threshold, it indicates a significant deviation from any of the expected rim shape. Consequently, the set of data points with such a high similarity distance is considered to belong to an object other than the rim. These data points are then filtered out or ignored in further processing. This method ensures that only the data points closely matching the rim's shape are retained, enhancing the accuracy of the object identification within the scanned area. This approach is particularly effective in distinguishing between the container's rim and any other objects that might interfere with the scan's interpretability (including the tablet/controller 240 in FIG. 2 that may be captured by the 3D camera).

In some embodiments, the features extracted from the 3D image may be used to adjust the 2D image. For instance, if the downward scanning process on the 3D image detects an object (e.g., a utensil) extending out of the rim of the container, the object may introduce noise data to the 2D image that may affect the container & food classification. In these cases, the object detected in the downward scanning of the 3D image may be erased from the 2D image before extracting the 2D features (e.g., color, shape, texture).

Figure 3B:
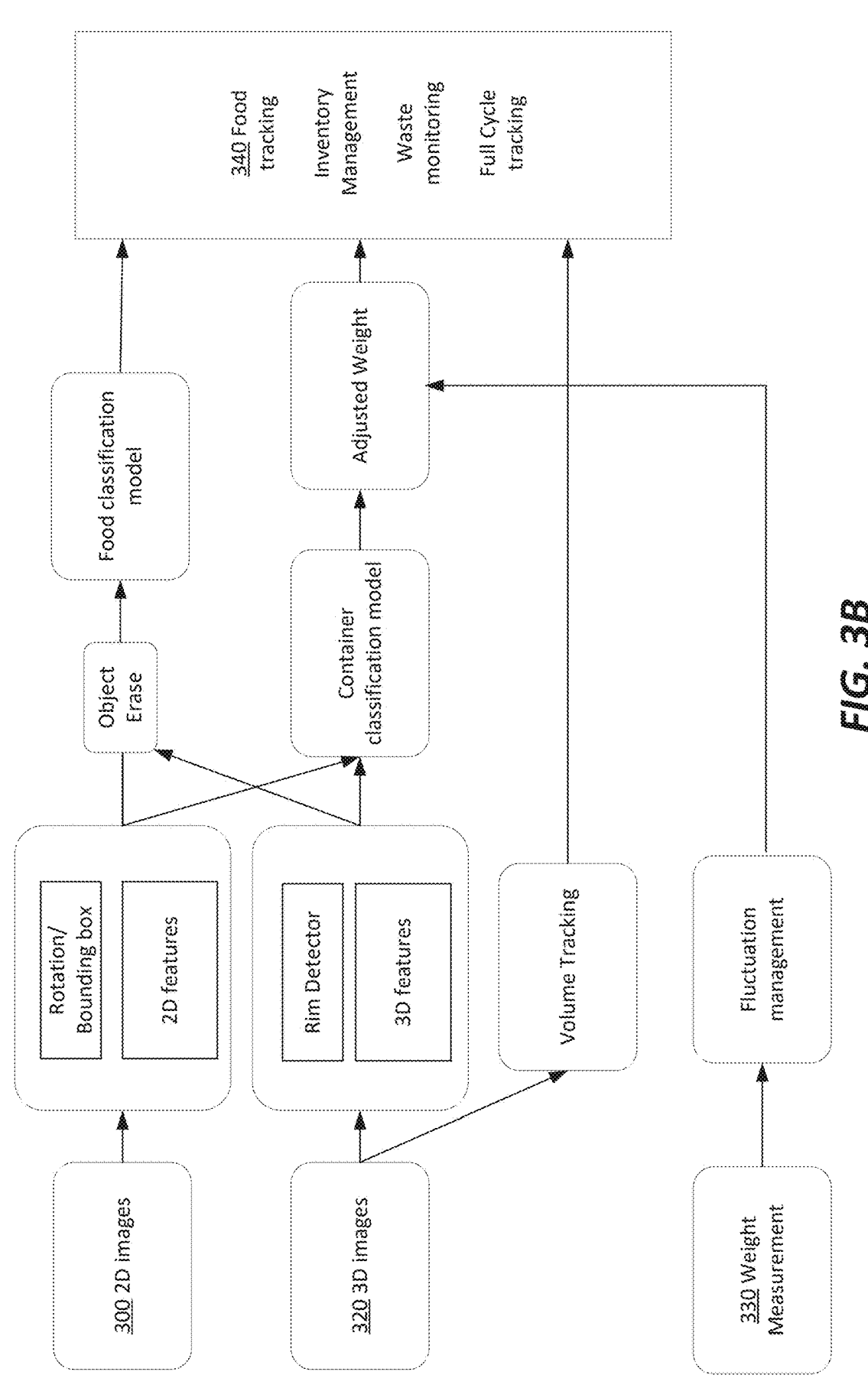
FIG. 3B illustrates an exemplary block diagram of an AI-powered food classification and consumption tracking system in accordance with some embodiments.

FIG. 3B illustrates an exemplary block diagram of an AI-powered food classification and consumption tracking system in accordance with some embodiments. As shown, the system may include multiple input streams obtained from sensors monitoring a food item in a food container. The input streams may include 2D images 300 captured by a 2D camera, 3D images 320 captured by a 3D camera, and weight measurements 330 captured by a scale. Various features may be extracted from these input streams for classifying and identifying the food item, the food container, the weight and/or volume of the food item, etc. These data may be used in downstream applications 340 such as food tracking, inventory management, waste monitoring, or full cycle nutrition tracking.

In some embodiments, features extracted from one input stream may be used in a second input stream to enhance the object classification and weight measurement. For instance, as described in FIG. 3A, the downward scanning process on the 3D images 320 may detect an object extending above and over the rim of the container. This detected object block certain portion of the food item or container in the 2D image 300. Therefore, the object may be erased from the 2D image 300 before the 2D features are extracted.

As another example, the features extracted from the 3D images 320 and the 2D images 300 capturing the food container may be aggregated to provide a comprehensive feature set for classifying the food container. As mentioned in FIG. 3A, the 3D features extracted from the 3D images 320 may include the depth information and volume information, and the 2D features extracted from the 2D images 300 may include color, texture, and shape. Some containers may have same 2D features but different 3D features, while some containers may have same 3D features but different 2D features. Therefore, combining the 2D features with the 3D features may result in a more accurate food container classification.

In practical settings, when a user places a container on the scale, it might not align perfectly with the 2D camera's reference axis. During the food identification process, the food classification model uses the 2D image 300 to generate a bounding box around the food item or its container. However, if the container's orientation differs from the camera's reference axis, the bounding box—aligned with the camera's axis—might incorrectly include areas outside the container. This misalignment can result in classification inaccuracies and generate superfluous data, thereby leading to increased data processing costs.

To resolve this issue, the 2D image 300 may undergo a rotation adjustment to realign the container's orientation with the camera's reference axis. Once aligned, the bounding box can be accurately positioned to encompass just the food container. The food classification model, potentially a neural network, can then accurately extract features such as color, shape, and texture from within the properly adjusted bounding box. The image rotation process can be carried out by the controller 170 shown in FIG. 1B or the controller 240 in FIG. 2.

For instance, after the 2D camera captures a 2D image of a food container placed by a user on the scale, specific points or markers within the image can be identified. These points are expected to align with a reference axis. By determining the angle of misalignment, a rotation matrix may be computed. Applying this rotation matrix to the 2D image adjusts its coordinates and interpolates new pixel values, effectively rotating the image to align it with the reference axis.

In some embodiments, the weight measurement 330 handles the weight reading fluctuation cases. For instance, when a user places a bowl of liquid (e.g., soup, wine, etc.), the weight readings may fluctuate for a period of time before stabilizing. The fluctuation management may apply algorithms like moving average, exponential moving average, or low-pass filters to obtain the accurate weight reading.

Figure 3C:
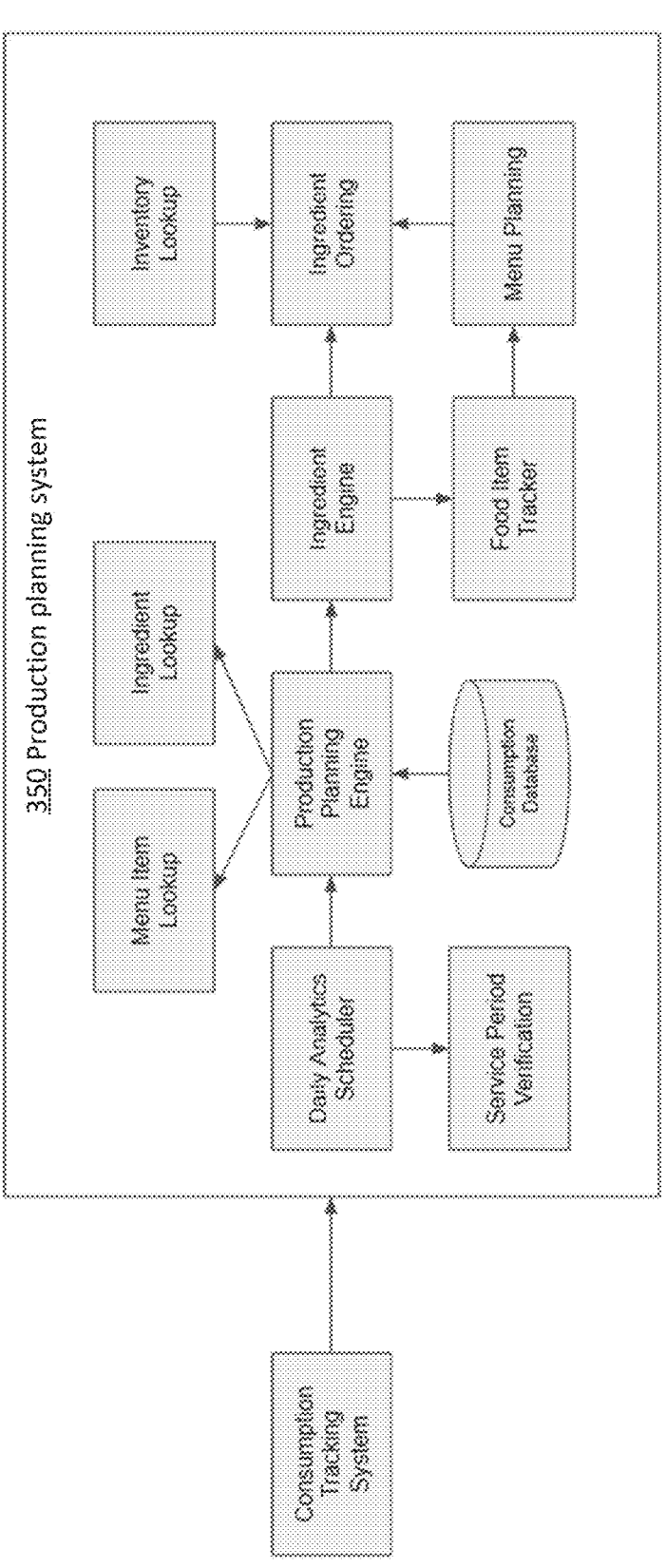
FIG. 3C illustrates an exemplary system diagram for production planning using the AI-powered food classification and consumption tracking system in accordance with some embodiments.

FIG. 3C illustrates an exemplary system diagram for production planning using the AI-powered food classification and consumption tracking system in accordance with some embodiments.

The production planning system 350 may include a production planning engine configured to retrieve data from a consumption database and generate various production planning pipelines accordingly.

In some embodiments, the production planning engine may perform daily analytics and service period verification based on the food consumption tracking data. The analytics may be helpful for the service provider to understand the food consumption trends in recent periods and generate consumer reports for the users.

In some embodiments, the production planning engine may track the ingredients consumptions, and generate inventory lookup requests, ingredient ordering requests, or menu planning. For instance, when a specific ingredient experiences a fast consumption rate and the production planning engine predicts the ingredient will be out of stock within a threshold time, the production planning engine may generate alerts to order more of the ingredient in time.

FIG. 4 illustrates another exemplary system diagram of an AI-powered food classification and consumption tracking system in accordance with some embodiments. FIGS. 1B-3B focus on the AI-powered food classification and consumption tracking apparatus (hereafter referred to as AI-powered apparatus for simplicity), which could be implemented as an edge device at food stations or service areas. In large venues, multiple such devices might be deployed across various areas, or a food service provider chain might implement these devices across multiple locations. In these cases, a server may be required to orchestra the data synchronization, centralized training data labeling, machine learning model updates, data propagation (e.g., new training data obtained from one apparatus at one location, after being verified, may be propagated to other apparatus at other locations), etc.

The system diagram in FIG. 4 illustrates the data flow among the AI-powered apparatuses 301 (each including a camera and a scale, and an attached controller 300) and one or more severs, such as AI servers 306 and 307, application server 302, a blob storage 305, and user interfaces 303 (for displaying the food consumption for individuals or for the service providers) and 308 (for user or employee to label unknown images manually). Note that these servers in FIG. 4 are drawn to show different functionalities implemented outside of the edge devices 301. These functionalities may be implemented on a single physical server, or across two or more separate physical servers. The separated components in FIG. 4 do not imply that these functionalities must be implemented using separate hardware.

In some embodiments, each of the edge device, i.e., the AI-powered apparatus 301 may have a 2D camera, a 3D camera, and a scale to capture various features of a food container that is placed on the scale by a user. The controllers 300 may be implemented in a form of mini controllers as a part of the apparatus 301. The controllers 300 may be directly attached to the apparatus (e.g., either as a tablet, a smart phone, or another suitable hardware device or an integrated circuit), or remotely connected to the apparatus 301 (e.g., through WiFi or Bluetooth, or another suitable wireless or wired connection).

In some embodiments, the controllers 300 may store (1) a trained metrics-learning model for generating embeddings for the images captured by the cameras 301 (including both 2D images and 3D images), (2) a trained food classification model (e.g., a combination of a metrics-learning model with a neural network-based classification model) for classifying the embeddings of the captured food item, and (3) a trained food container classification model (e.g., a combination of a YOLO model with a statistical model) for classifying the embeddings of the captured food container, thereby identifying the food container and obtaining the actual weight of the food in the food container.

Here, metrics learning refers to a machine learning method for object recognition, which involves generating multi-dimensional numerical embeddings to represent observed objects (i.e., the food item in an image or a food container in a point cloud). The goal of the metrics learning is to learn an embedding model that generates the high-dimensional embedding that represents various attributes of the observed object in the captured image or point cloud.

For instance, the 2D features extracted from 2D images may be embeddings that represent color information, texture information (e.g., edge detection to show crispy texture or smooth texture), shape information (contour detection), size and portion information (e.g., relative sizes of different components in a dish may imply the dish's identity), ingredient information (e.g., visible ingredients), etc., for identifying the food item. As another example, the 3D features extracted from the 3D images may include depth information, volume information, or other types of contextual features for identify the food container.

In these practical applications, the number of images of a given food item is usually very small (e.g., one or handful images per dish). The training process of the classification model can only rely on such limited training samples. To address this issue, the image of a food item may by transformed or augmented to create multiple samples, which can then be used to generate a variety of embeddings. Such transformation or augmentation may include cropping (taking different parts of the image to focus on specific features), rotation (rotating the image by various angles to simulate different orientations), scaling (resizing the image to various scales to mimic closer or farther away shots), color modification (altering color settings like brightness, contrast, or saturation to simulate different lighting conditions), flipping, noise addition (adding synthetic noise to the image to improve robustness against visual noise in real-world scenarios), etc.

In some embodiments, two different metrics-learning models may be trained and deployed for the 2D image processing and 3D point cloud processing, respectively. The metrics-learning model undergoes a training regime that iteratively refines the algorithm responsible for generating embeddings, aiming to widen the gap between embeddings of different food items/containers while narrowing it among embeddings of identical or similar food items/containers. The 2D features and 3D features may be aggregated for classification in different scenarios illustrated in FIG. 3B.

In some embodiments, the food classification model on the controller 300 may classify a given embedding of a food item in an image based on a plurality of known food items. The known food items may be represented as labels. The K-Nearest Neighbors (KNN) model, for example, could be utilized as the food classification model to measure the distances between the embedding of the food item awaiting classification and the embeddings corresponding to the known food items. It's important to note that a single known food item could be associated with multiple embeddings, capturing various appearances of the food item, such as cooked differently (under-cooked or over-cooked), served differently with different condiments, under varied lighting conditions, from multiple angles, or at different stages of consumption. When determining whether the to-be-classified embedding should be classified as a known food item, the food classification model may compute the distance between the to-be-classified embedding and each of the embeddings representing the known food item. The multiple distances may be aggregated as a weighted sum indicating the overall quantified similarity between the observed food item and the known food item.

In some embodiments, the K-Nearest Neighbors (KNN) model may be employed as the food classification model, to reach a verdict based on the distances between the embedding of the food item awaiting classification and the embeddings corresponding to the known food items.

During the classification process, the food classification model evaluates the proximity between the embedding awaiting classification and each of the embeddings corresponding to the known food items. The final classification decision may be determined by employing a voting mechanism among embeddings that have sufficient proximity to the to-be-classified item. This approach allows for filtering out dissimilar embeddings before employing the voting method for classification, ensuring a more accurate classification outcome. Should there be no similar embeddings, the embedding may be deemed to be a new item or a known item in a new condition which can be utilized to amend the known embeddings for future improvement of such classification. When the image of the food item (corresponding to the embeddings) is labeled, e.g., through 308 in FIG. 4, the model will be able to determine whether the food item is new food item (e.g., using a new label) or a known food item in a new condition (e.g., using an existing label but with different embeddings). In cases of the latter, the new set of embeddings is also linked to the same label to improve the accuracy of future classifications.

In some embodiments, the food container classification model on the controller 300 may be implemented to perform the downward scanning of a point cloud of a food container to identify the rim, the shape, and/or the volume of the food container (called 3D features), and then classify the food container based on these 3D features. In some cases, 2D features extracted from the 2D images (such as texture, color) may be supplemented to the food container classification model to further improve classification accuracy. An example downward scanning process is described in FIG. 3A.

In some embodiments artificial intelligence (AI) methods can be used to filter out objects captured by the camera other than the food container. These methods include, but are not limited to clustering approaches.

In some embodiments, statistical methods could be implemented to orient a model of the food container in a certain direction to make it possible to identify said container as one previously introduced to the system.

In some embodiments, when a camera (2D or 3D) captures an image (a 2D image or a 3D point cloud) of a food object (including a food container containing a food item), the corresponding controller 300 may generate an embedding for the food object in the image using the metrics-learning model. The embedding may then be fed into the food classification model to determine whether the food item in the image should be classified as one of the known food items, and into the food container classification model to determine whether the food container is one of known food containers registered during the onboarding process.

If the distance between the generated embedding and the embedding(s) of a known food item/container is below a threshold, the food item in the item/container may be classified as the known food item/container, and the embedding of the food item/container in the image is assigned with the label of the known food item/container. In the following description, the "embedding of the food item/container" and the "image of the food item/container" may be used interchangeably because the embedding is a numerical representation of the food item/container and the image is a visual representation of the food item/container, and there is one-to-one mapping relationship between the numerical embedding and the visual image of the same food item/container. Accordingly, the assignment of the label to the embedding of the food item/container may also be interpreted as assigning the label to the image of the food item/container.

If the generated embedding for the image of the food item/container is not within a distance threshold from any known food item/container, the controller 300 may assign a provisional label to the image of the item/container. The provisional label may be one of the known labels with the shortest embedding distance from the embedding of this unknown food item/container, or a randomly generated label. The purpose of assigning this provisional label is to continue the food/container classification at the camera/controller even when the classification models are not able to classify such a food item/container yet. Essentially, the provisional label and the embedding of the image of the food item/container are stored and treated as a "known" food item/container with a "known" label. In other words, the provisional label and the embedding of the image of the food item/container are temporarily ingested into the classification models at the controller 300.

Note that the provisional label and the embedding of the image of the food item/container are locally stored at the specific controller 300 to enhance the local classification models. This enables the on-the-fly training by assigning the provisional label and using the provisional label for subsequent classification inquiries. This information has not propagated to other controllers 300 yet. The propagation will occur after a formal food item/container label is assigned to the images of the food item/container through the application server 302 and the associating between the image and the label is verified by the AI server 306.

In some embodiments, after an image is assigned with a provisional label, the image is sent to the application server 302 for labeling. The application server 302 may have a graphic user interface (GUI) 308 for an operator to manually label the images. In some embodiments, the labeling of the images may be delayed and processed as a batch, at least because the controllers 300 is able to continue its local food/container classification tasks using the provisional labels with accuracy. That is, the lack of formal labeling does not block the controllers 300 or degrade the performance of the mini controllers 300. By allowing the delay, the batch labeling process provides several technical advantages. First, by processing large blocks of data at once, batch labeling can significantly reduce the time and computational resources needed compared to processing each item individually. This efficiency comes from minimizing the overhead of starting and stopping processes for each task. Second, the application server 302 may store the received images and perform local clustering operations using image processing techniques, such that similar images are clustered as groups. The grouped images further improve the labeling efficiency at the application server 302.

After the labeling process is finished at the application server 302, the newly labeled images are sent to the storage 305. On the other side, the mini controllers 300 may also send all the labels and embeddings to the storage 305. The storage 305 may be in the form of a Binary Large Object (BLOB) storage designed for handling large pieces of unstructured data such as images, audio, video, documents, and more, which do not conform to the traditional database formats of rows and columns. BLOB storage is optimized to store massive amounts of such data efficiently, providing a scalable and cost-effective solution for businesses and applications dealing with large or complex data types.

In some embodiments, the newly labeled images stored in the storage 305 (e.g., received from the application server 302) indicate that there are new food items or containers detected by the cameras 301. This may trigger the update or retraining of the food/container classification model to incorporate these new food items/containers. In particular, the AI server 306 may use these newly labeled images as new training data to update the labels and known food items/containers in the classification models.

For instance, for each new food item with newly assigned label, the AI server 306 may generate an embedding using the metrics-learning model, associating the newly assigned label with the embedding, and updating the food/container classification model to classify any future images having similar embeddings as the new food item. In some embodiments, the AI server 306 may then broadcast the updated food/container classification model to the edge devices, i.e., the mini controllers 300, to propagate the new food items for future food/container classification at all locations. For instance, the AI server 306 may upload the embeddings of the new food items with the associated labels to the storage 305, and the mini controllers 300 may retrieve the embeddings and labels from the storage 305 (following a predetermined schedule, e.g., every morning), which effectively update its locally stored food/container classification models.

In some embodiments, the AI server 306 may be further configured to verify all the images, the embeddings of the images, and the labels assigned to the images that are stored in the storage 305. The verification may involve applying the metrics-learning model to generate verification embeddings for the images, applying the food/container classification model to re-classify the verification embeddings and assign labels, and then verifying that the verification embeddings with labels match with the embeddings and the labels stored in the storage 305. This is to detect any model temptation or damages at the edge devices (i.e., the controllers). In some embodiments, this is also to detect any controller that needs model update (e.g., the food/container classification model update).

In some embodiments, the AI server 307 is responsible for preparing (training), the metrics-learning model, the food/container classification model, and the food container classification model that are to be deployed on the controllers 300. To enhance the performance of these models, the AI server 307 may employ a dual-phase process to train the metrics-learning model and the food/container classification model. First, a generic metrics-learning model and a generic food/container classification model may be obtained. These generic models are pre-trained based on training data obtained from a generic domain (e.g., images of various fruits, vegetables, thousands of images of known dishes). Second, the AI server may fine-tune the generic metrics-learning model and the generic food/container classification model based on domain-specific training data from the service line to obtain the metrics-learning model and the food/container classification model. The domain-specific training data may include the dishes and/or ingredients and/or food containers and utensils that are from the specific food service provider. Subsequently, the metrics-learning model and the food/container classification model are distributed to the controllers 300 to perform edge inference tasks including generating embeddings for captured images of food items and classifying the embeddings of the images.

In some embodiments, when the verification process on the AI server 306 shows a rate of misclassification being greater than a threshold, the AI server 307 may be triggered to fine-tune the metrics-learning model and the food/container classification model using additional training data from the service line.

In some embodiments, the metrics-learning model may be updated by the AI server 307, and the food/container classification model may be updated by both AI servers 306 and 307. Typically, the introduction of new food items—such as new combinations of known ingredients—triggers updates to the food/container classification model. On the other hand, the metric-learning model is updated in response to the emergence of new ingredients or new containers, particularly those that have not been previously included in any food items or completely different from the preregistered containers. Consequently, the metric-learning model is updated less frequently than the food/container classification model, given that the occurrence of new food items or containers is more common than the introduction of new ingredients.

In some embodiments, when an unknown food item is detected by the apparatus 301, a local labeling may be performed in real-time through a display associated with the apparatus 301. For instance, the controller 301 may display the 2D image of the food item and a plurality of food labels corresponding to the plurality of pre-registered food items on a tablet (170 in FIG. 1B), allowing the user to select the proper label for the food item. Note that this labeling process occurs locally and in real-time, in contrast to the centralized and delayed labeling process occurred on the application server 302. The result of the local labeling is only used to enhance the local models on the apparatus 301. In some embodiments, the apparatus 301 may upload the user-selected label with the 2D image of the food item to the BLOB storage (or another server) to update the global models. When the updated global models are broadcasted to other apparatuses 301 at other locations, the data synchronization among the apparatuses 301 are complete.

This indicates that the system is undergoing continuous evolution. Local models are updated in real time using local training data, while the global model is updated less frequently but with more extensive training data. After the global model is broadcast and synchronized with the local models, a new cycle of local training can begin, which is then followed by another round of centralized updates.

FIG. 5 illustrates an exemplary method 500 for measuring food weight using the AI-powered food classification and consumption tracking system in accordance with some embodiments. In some implementations, one or more process blocks of FIG. 5 may be performed by a food classification and consumption tracking apparatus.

As shown in FIG. 5, process 500 may include obtaining, from a scale, a first weight measurement of a container filled with food (block 510). For example, the food identifying apparatus may obtain, from a scale, a first weight measurement of a container filled with food, as described above.

As also shown in FIG. 5, process 500 may include capturing, using a 2D camera, a 2D image of the container (block 520). For example, the food identifying apparatus may capture, using a 2d camera, a 2d image of the container, as described above.

As further shown in FIG. 5, process 500 may include capturing, using a 3D camera, a point cloud of the container (block 530). For example, the food identifying apparatus may capture, using a 3d camera, a point cloud of the container, as described above.

As also shown in FIG. 5, process 500 may include extracting a first set of features of the container from the 2D image of the container (block 540). For example, the food identifying apparatus may extract a first set of features of the container from the 2*d* image of the container, as described above.

As further shown in FIG. 5, process 500 may include scanning, from a top of the point cloud and moving downward, each plane of data points in the point cloud to detect a shape of a rim of the container (block 550). For example, the food identifying apparatus may scan, from a top of the point cloud and moving downward, each plane of data points in the point cloud to detect a shape of a rim of the container, as described above.

As also shown in FIG. 5, process 500 may include identifying the container based on the first set of features and the shape of the rim of the container (block 560). For example, the food identifying apparatus may identify the container based on the first set of features and the shape of the rim of the container, as described above.

As further shown in FIG. 5, process 500 may include obtaining a pre-stored second weight measurement corresponding to the identified container, where the second weight measurement was measured when the identified container is empty (block 570). For example, the food identifying apparatus may obtain a pre-stored second weight measurement corresponding to the identified container, where the second weight measurement was measured when the identified container is empty, as described above.

As also shown in FIG. 5, process 500 may include obtaining a weight measurement of the food in the container based on the first weight measurement and the second weight measurement (block 580). For example, the food identifying apparatus may obtain a weight measurement of the food in the container based on the first weight measurement and the second weight measurement, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
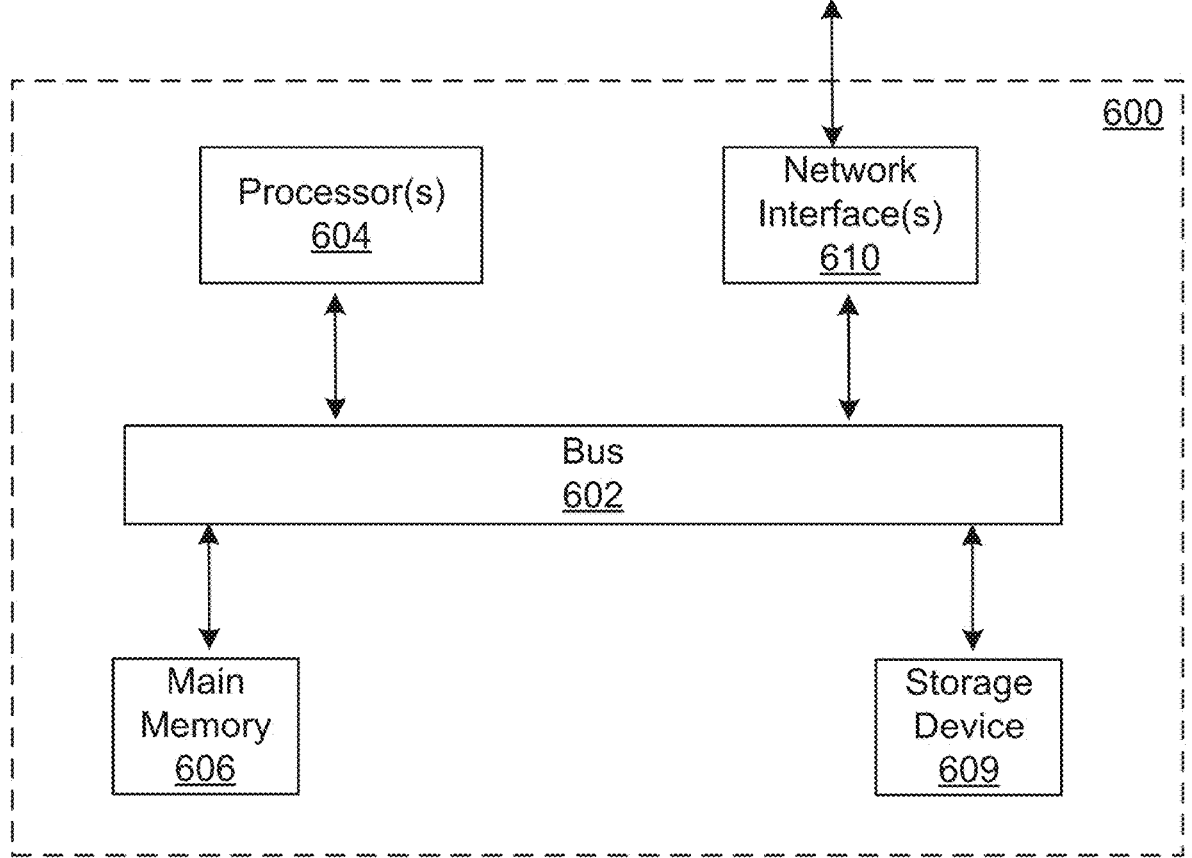
FIG. 6 illustrates an example computing device in which any of the embodiments described herein may be implemented.

FIG. 6 illustrates an example computing device in which any of the embodiments described herein may be implemented. The computing device may be used to implement one or more components of the systems and the methods shown in FIGS. 1-5. The computing device 600 may comprise a bus 602 or other communication mechanisms for communicating information and one or more hardware processors 604 coupled with bus 602 for processing information. Hardware processor(s) 604 may be, for example, one or more general-purpose microprocessors.

The computing device 600 may also include a main memory 606, such as a random-access memory (RAM), cache, and/or other dynamic storage devices, coupled to bus 602 for storing information and instructions to be executed by processor(s) 604. Main memory 606 also may be used for storing provisional variables or other intermediate information during the execution of instructions to be executed by processor(s) 604. Such instructions, when stored in storage media accessible to processor(s) 604, may render computing device 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 609. Execution of the sequences of instructions contained in main memory 606 may cause processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 610 coupled to bus 602. Communication interface 610 may provide a two-way data communication coupling to one or more network links that are connected to one or more networks. As another example, communication interface 610 may be a local area network (LAN) card to provide a data communication connection to a compatible LAN (or WAN component to communicate with a WAN). Wireless links may also be implemented.

Certain operations may be performed in a distributed manner among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor-executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be composed in program codes or instructions stored in a memory (e.g., a non-transitory computer-readable storage medium described above). Such an algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

Certain of the operations may be performed in a distributed manner among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is in fact disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The terms "include" or "comprise" are used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An apparatus, comprising:

a scale with a plurality of weight sensors, a 2-dimensional (2D) camera, a 3-dimensional (3D) camera, and one or more processors and one or more non-transitory computer-readable memories coupled to the one or more processors and configured with instructions executable by the one or more processors to perform operations comprising:

in response to a container filled with food being placed on the scale:

obtaining, from the scale, a first weight measurement of the container;

capturing, using the 2D camera, a 2D image of the container;

capturing, using the 3D camera, a point cloud of the container;

extracting a first set of features of the container from the 2D image of the container;

scanning, from a top of the point cloud and moving downward, each plane of data points in the point cloud to extract a second set of features of the container;

identifying the container based on the first set of features and the second set of features;

obtaining a pre-stored second weight measurement corresponding to the identified container, wherein the second weight measurement was measured when the identified container is empty; and obtaining a weight measurement of the food in the container based on the first weight measurement and the second weight measurement.

2. The apparatus of claim 1, wherein the extracting the second set of features of the container from the point cloud comprises:

detecting a rim of the container from the downward scanning of the point cloud.

3. The apparatus of claim 2, wherein the detecting the rim of the container from the scanning comprises:

in response to hitting a first plane of data points with identical depth values, determining that the first plane of data points represents the rim of the container.

4. The apparatus of claim 2, wherein the operations further comprising:

pre-registering shapes of rims of a plurality of containers to be used with the apparatus; and the detecting the rim of the container from the scanning comprises:

in response to (1) hitting a first plane of data points with identical depth values and (2) the first plane of data points matching with one of the pre-registered shapes of rims, determining that the first plane of data points represents the rim of the container.

5. The apparatus of claim 1, wherein the operations further comprising:

determining an orientation of the container in the 2D image; and rotating the 2D image of the container to align the orientation of the container with reference axis of the 2D camera.

6. The apparatus of claim 5, wherein the extracting the first set of features of the container from the 2D image of the container comprises:

generating a bounding box surrounding the rotated 2D image of the container; and extracting, using a first machine learning model, the first set of features of the container within the bounding box.

7. The apparatus of claim 1, wherein the first set of features of the container comprises texture information, color, size, or shape.

8. The apparatus of claim 1, wherein the second set of features of the container comprises a shape of a rim of the container, depth information of the container, or volume.

9. The apparatus of claim 1, wherein the extracting the second set of features of the container from the point cloud comprises:

scanning, from the top of the point cloud and moving downward, the each plane of data points in the point cloud;

in response to that (1) a plane of data points has a cluster of data points with identical depth values and (2) a shape formed by the cluster of data points does not match with any of pre-registered shapes of rims, determining that the cluster of data points belong to an object extended above a rim of the container; and continuing the scanning by ignoring the cluster of data points.

10. The apparatus of claim 1, wherein the extracting the first set of features of the container from the 2D image of the container comprises:

detecting an object extended over a rim of the container; and erasing the object from the 2D image before detecting the first set of features.

11. The apparatus of claim 1, wherein the operations further comprise:

identifying, using a local food classification model, the food in the container based on the first set of features as one of a plurality of pre-registered food items, wherein the local food classification model is machine learning model downloaded from a server.

12. The apparatus of claim 11, further comprising:

a controller configured to:

in response to failure to identify the food as one of the plurality of pre-registered food items, display the 2D image of the food and a plurality of food labels corresponding to the plurality of pre-registered food items;

receive a user-selected food label from plurality of food labels; and retrain the local food classification model based on the user-selected food label and the 2D image for subsequent food identification at the apparatus.

13. The apparatus of claim 12, wherein the operations further comprise:

uploading the user-selected food label and the 2D image to the server, for the server to update the machine learning model on the server, and broadcast the updated machine learning model to other apparatuses.

14. A system for food classification, comprising:

a plurality of food scanning apparatuses deployed at different areas for scanning food containers, each food scanning apparatus comprising a scale, a 3D camera, and one or more processors, wherein the one or more processors in the food scanning apparatus are configured to:

in response to a container filled with food being placed on the scale, obtain, from the scale, a first weight measurement of the container filled with food;

capture, using the 3D camera, a point cloud of the container;

determine a rim shape and a volume of the container based on the point cloud of the container;

identify the container based on the rim shape and the volume of the container;

obtain a pre-stored second weight measurement corresponding to the identified container, wherein the second weight measurement was measured when the identified container is empty; and obtain a weight measurement of the food in the container based on the first weight measurement and the second weight measurement.

15. The system of claim 14, wherein the food scanning apparatus further comprises:

a 2D camera, configured to capture a 2D image of the container; and a server, wherein the one or more processors in the food scanning apparatus are further configured to:

extract a first set of features of the container from the 2D image of the container; and identify, using a local food classification model stored on the food scanning apparatus, the food in the container based on the first set of features as one of a plurality of pre-registered food items, wherein the local food classification model is machine learning model downloaded from the server.

16. The system of claim 15, wherein the one or more processors in the food scanning apparatus are further configured to:

in response to failure to identify the food as one of the plurality of pre-registered food items, display the 2D image of the food and a plurality of food labels corresponding to the plurality of pre-registered food items;

receive a user-selected food label from plurality of food labels; and retrain the local food classification model with the user-selected food label and the 2D image for subsequent food identification at the food scanning apparatus.

17. The system of claim 16, wherein the one or more processors in the food scanning apparatus are further configured to:

upload the user-selected food label and the 2D image to the server, for the server to update the machine learning model on the server.

18. The system of claim 17, wherein the server is further configured to:

broadcast the updated machine learning model to other food scanning apparatuses.

19. The system of claim 15, wherein to extract the first set of features of the container from the 2D image of the container, the one or more processors in the food scanning apparatus are further configured to:

determine an orientation of the container in the 2D image;

rotate the 2D image of the container to align the orientation of the container with reference axis of the 2D camera;

generate a bounding box surrounding the rotated 2D image of the container; and extract, using a first machine learning model, the first set of features of the container within the bounding box.

20. A computer-implemented method, comprising:

obtaining, from a scale, a first weight measurement of a container filled with food;

capturing, using a 2D camera, a 2D image of the container;

capturing, using a 3D camera, a point cloud of the container;

extracting a first set of features of the container from the 2D image of the container;

scanning, from a top of the point cloud and moving downward, each plane of data points in the point cloud to detect a shape of a rim of the container;

identifying the container based on the first set of features and the shape of the rim of the container;

obtaining a pre-stored second weight measurement corresponding to the identified container, wherein the second weight measurement was measured when the identified container is empty; and obtaining a weight measurement of the food in the container based on the first weight measurement and the second weight measurement.

* * * * *